A. J. COLBURN.
Lumber-Rule.
No. 204,293.   Patented May 28, 1878.
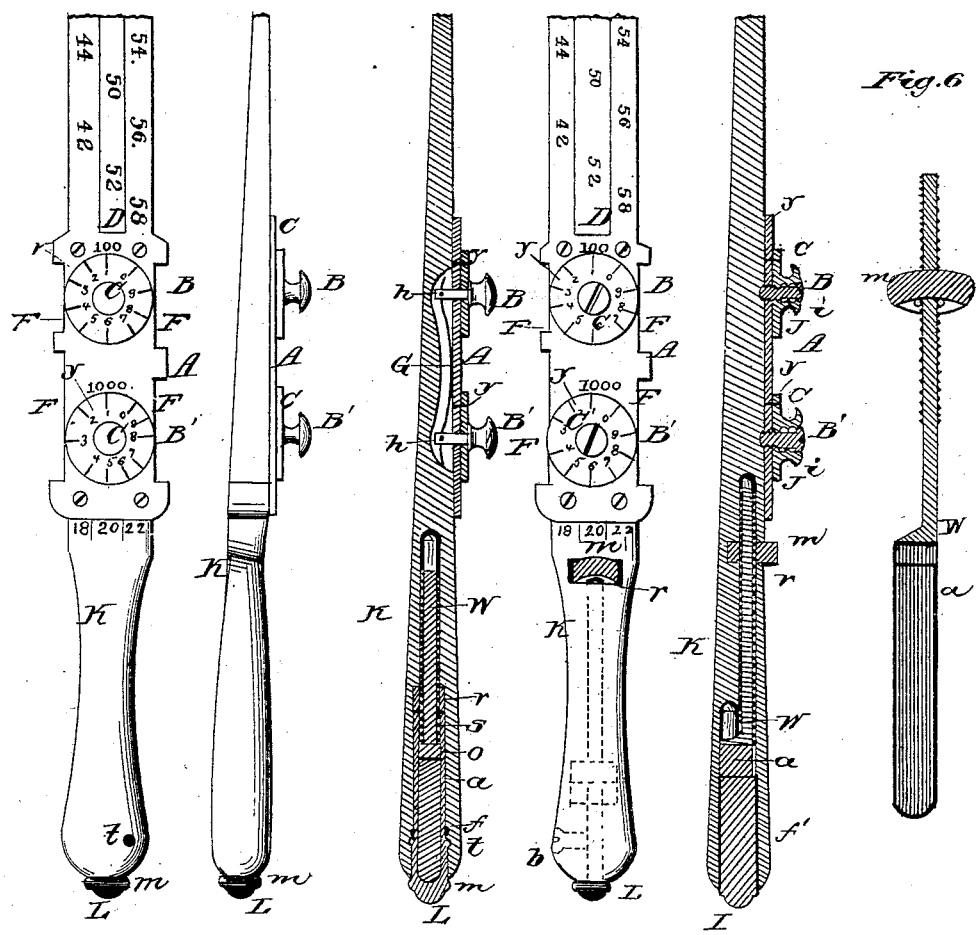

UNITED STATES PATENT OFFICE.

ADONIRUM J. COLBURN, OF GREENVILLE, MICHIGAN.

IMPROVEMENT IN LUMBER-RULES.

Specification forming part of Letters Patent No. 204,293, dated May 28, 1878; application filed March 25, 1878.

*To all whom it may concern:*

Be it known that I, ADONIRUM J. COLBURN, of Greenville, in the county of Montcalm and State of Michigan, have invented certain new and useful Improvements in Lumber-Rules; and I do hereby declare that the following is a full, clear, and exact description thereof, which will enable others skilled in the art to which it appertains to make and use the same, reference being had to the accompanying drawings, which form a part of this specification, and in which—

Figure 1 is a front view of my lumber-rule with my improvement attached. Fig. 2 is a side view, and Fig. 3 is a vertical section, of the same.

The object of my invention is to furnish a device which combines a fourfold purpose—namely, a lumber-rule, pencil, gage, and register—the operation and construction of which are hereinafter described and set forth.

Corresponding letters of reference in each of the figures and parts.

Fig. 1 represents my lumber-rule broken off, with sufficient remaining to show the scale for measuring lumber. A represents the gage for measuring the thickness of lumber, having notches in the sides, F F F F. Attached to the front of the same are two dial-plates, B B', having milled burrs C C, and around the outer edge of each of the dial-plates, in equal spaces, are the ten digits, reading from right hand to left, with a hole after each digit. Directly over each of the dials are the numbers 100 and 1,000, marked, respectively, over B and B'. Under the gage-plate A in Fig. 3 is represented a curved spring, G, resting in the center against the plate A, and at each end over the pins $h\ h$ in the axles of the dial-plates B B', thus holding the dial-plate securely to the gage-plate A by means of the pin $y$ and holes after each digit, the pin $y$ being made fast in the gage-plate A, to hold the dial-plate in any desired position.

The operation of the gage-plate A will be readily understood by the notches of different spaces, (marked F F F F,) and may be of any desired width or number.

The operation of the register is as follows: For example, when you may have a measurement of twenty feet, commence at the dial B, pull out on the milled burr C, and revolve it until the figure 2 stands under the 100; then let it down on the pin $y$, and you have the representation of twenty feet, each figure representing an additional ten feet, the fractional feet being carried in memory to the next measurement, and so on until you get one hundred feet; then the same operation with the dial B', each figure representing one hundred feet.

My pencil attached is represented by L, and is inserted in a tube having an internal thread, $s$, in Fig. 3, a milled end, $m$, a groove and pin, $t$, a rubber ring, $f$, going round the tube $m$, a piece of rubber under the inserted end $a$ to obviate the concussion and slack motion in its operation, the rubber being held by the socket $o$, to which is attached a rod, W, having a thread on two sides and two sides flat. The same rod is held from revolving by means of a slotted piece of metal, $r$, inserted in its place, and the rod shoved through the same. The pencil is moved in or out by revolving the tube $m$ with thumb and finger.

Figs. 4 and 5 represent a little different operation of my dial and pencil, which, in some points, may be preferable. The gage is the same as in Figs. 1, 2, and 3. The dials are held in place by means of spiral springs J J in Fig. 5, the springs resting against the inside of the heads of the slotted screws $i\ i$ (which are made fast to the gage-plate A) and the inside of the dial-plate. The pencil is moved by means of the burr $m$ and the rod W, which is held from revolving by means of a piece of slotted metal, $r$, inserted before the rod is put in place. $a$ is rubber for the same purpose as described in Fig. 3. $f'$ represents rubber or paper wrapped round the pencil, and held in place by means of a tension-screw, $b$, shown in Fig. 4, Fig. 6 being simply a view of the pencil L, rod W, rubber $a$, and burr $m$, separately and on a larger scale.

The construction of my gage is not confined to a specified number of notches, or my register to a specified number of dials. It is obvious that I can register from one foot to an unlimited amount by additional dials.

Having thus described my invention, what I claim as new, and desire to secure by Letters Patent, is—

1. The dials B B', having elliptic or spiral springs connected therewith, as shown in Figs. 3 and 5.

2. In a lumber rule and gage, the tube $m$, having internal screw-thread $s$, in combination with the screw-threaded rod W, rubber ring $f$, rubber block $a$, and pencil L, all arranged and operating substantially as herein described, for the purpose set forth.

In testimony that I claim the foregoing as my own I have hereto affixed my signature in presence of two witnesses.

ADONIRUM J. COLBURN.

Witnesses:
ALEXANDER GLEASON,
HERMAN B. COLBURN.